*(12)* United States Patent
Zivanovic et al.

(10) Patent No.: US 8,210,226 B2
(45) Date of Patent: Jul. 3, 2012

(54) METHOD AND MACHINE FOR REINFORCING AN EMBEDDED CYLINDRICAL PIPE

(75) Inventors: Ivica Zivanovic, Velizy Villacoublay (FR); Christian Tourneur, Velizy Villacoublay (FR); Benoit Lecinq, Velizy Villacoublay (FR); Baruch Gedalia, Velizy Villacoublay (FR)

(73) Assignee: Freyssinét, Velizy Villacoublay (FR)

( * ) Notice: Subject to any disclaimer, the term of this patent is extended or adjusted under 35 U.S.C. 154(b) by 0 days.

(21) Appl. No.: 12/848,601

(22) Filed: Aug. 2, 2010

(65) Prior Publication Data

US 2011/0094659 A1    Apr. 28, 2011

Related U.S. Application Data

(63) Continuation of application No. 10/584,732, filed as application No. PCT/EP2006/004588 on Apr. 20, 2006, now abandoned.

(51) Int. Cl.
*B32B 37/00* (2006.01)
*B29C 65/00* (2006.01)

(52) U.S. Cl. ........ 156/575; 156/574; 156/523; 156/524; 156/187; 156/195; 156/293; 156/294

(58) Field of Classification Search .......... 156/184–187, 156/195, 523–524, 574, 577, 293–294
See application file for complete search history.

(56) References Cited

U.S. PATENT DOCUMENTS

| | | | |
|---|---|---|---|
| 2,133,013 A | 10/1938 | Boylan et al. | |
| 2,516,242 A | 7/1950 | Munger | |
| 2,960,425 A * | 11/1960 | Sherman | 156/82 |
| 3,232,812 A | 2/1966 | Lorentz et al. | |
| 3,340,115 A | 9/1967 | Rubenstein | |
| 3,742,985 A | 7/1973 | Rubenstein | |
| 3,950,465 A | 4/1976 | Farahar | |
| 4,415,390 A * | 11/1983 | Smith | 156/187 |
| 4,578,424 A * | 3/1986 | Goel | 525/109 |
| 5,101,863 A | 4/1992 | Fujii et al. | |

(Continued)

FOREIGN PATENT DOCUMENTS

DE    2160144 A    12/1971

(Continued)

OTHER PUBLICATIONS

International Search Report of PCT/EP2006/004588 dated Jan. 5, 2007.

*Primary Examiner* — Khanh P Nguyen
*Assistant Examiner* — Carson Gross
(74) *Attorney, Agent, or Firm* — Banner & Witcoff, Ltd (57) ABSTRACT

A method of reinforcing an embedded cylinder pipe by applying a composite structural reinforcement within the pipe through in situ stratification of at least one band of reinforcement fibers and a resin or a resin including matrix comprising the steps of applying said band onto a contact area on an internal face of said pipe by means of a contacting member;

moving said contacting member along an helical path so that said contact area follows said path;

moving a main pressing member behind said contacting member along said path, to apply pressure to said band in a main pressure area separated from said contact area.

Related device for reinforcing an embedded cylinder pipe by applying a composite structural reinforcement within the pipe.

17 Claims, 4 Drawing Sheets

U.S. PATENT DOCUMENTS

| | | |
|---|---|---|
| 5,145,281 A | 9/1992 | Molyneux |
| 5,388,929 A | 2/1995 | Molyneux |
| 5,580,406 A | 12/1996 | O'ffill |
| 5,725,328 A | 3/1998 | Schmager |
| 5,762,450 A | 6/1998 | Schmager |
| 5,915,886 A | 6/1999 | McNeil |
| 5,931,198 A | 8/1999 | Raji et al. |
| 6,167,913 B1 | 1/2001 | Wood et al. |
| 6,602,025 B2 | 8/2003 | Markusch et al. |
| 6,926,466 B2 | 8/2005 | Pare |
| 7,044,340 B1 * | 5/2006 | McClellan .......... 222/318 |
| 7,080,441 B2 * | 7/2006 | Braun .......... 29/527.2 |
| 7,784,368 B2 * | 8/2010 | Gibson et al. .......... 73/865.8 |
| 2003/0178201 A1 | 9/2003 | Gleim et al. |
| 2003/0233894 A1 * | 12/2003 | Tezuka et al. .......... 73/865.8 |
| 2004/0231740 A1 | 11/2004 | Stubler et al. |
| 2005/0246995 A1 | 11/2005 | Lecinq et al. |

FOREIGN PATENT DOCUMENTS

| | | |
|---|---|---|
| DE | 4319285 A1 | 12/1994 |
| FR | 2869971 A1 | 11/2005 |
| WO | 9834742 | 8/1998 |
| WO | 0017564 | 3/2000 |
| WO | 03014614 A1 | 2/2003 |

* cited by examiner

METHOD AND MACHINE FOR REINFORCING AN EMBEDDED CYLINDRICAL PIPE

CROSS REFERENCE TO RELATED APPLICATIONS

This application is a continuation of Ser. No. 10/584,732 filed Jun. 26, 2006, application claims, under 35 USC §119, the benefit of priority of the filing date of Patent Cooperation Treaty patent application, Serial Number PCT/EP2006/004588, filed on Apr. 20, 2006, which is incorporated herein by reference.

The present invention relates to methods of reinforcing pipes and in particular repairing embedded pipes.

BACKGROUND OF THE INVENTION

These pipes belong for example to a water delivery network. In their most common form these pipes are constituted by an end to end assembly of segments of pipe made from pre-stressed concrete and having a relatively large diameter of typically 0.5 m to more than 6 m. Water flows through said pipes under a pressure of up to around twenty bars. These segments of concrete pipe can incorporate an interior metal cylinder (liner). The latter is not designed, however, to carry the stress in terms of pressure due to the fluid flowing through. This stress is carried by passive reinforcement (pre-fabricated cylindrical reinforcement cage) or by the pre-stressing of the concrete. The latter is realized by means of wires wound in a spiral outside of the concrete core of the pipe segment. During manufacture of this segment its concrete core is rotated about its axis to receive the wire which is checked in order to be brought under pressure. This wire is then protected against corrosion by projecting a supplementary layer of concrete or mortar over twenty to thirty millimeters.

The wall of the pipe usually comprises:
  a concrete core incorporating a watertight liner constituted by a ductile cylinder made from thin steel (so-called embedded-cylinder pipe). The concrete of the core is distributed between an internal layer of a few centimeters in thickness which is situated on the internal side of the pipe and a thicker external layer which in most cases is not reinforced;
  pre-stressing wires wound in one or two layers around the concrete core;
  protective anti-corrosion mortar surrounding the wires in order to passivate them;
  an optional paint or resin improving the anti-corrosion protection.

Pipes of this type are most frequently embedded. They are exposed to a risk of corrosion according to the aggressiveness of the environment. The most common form of degradation occurs as follows:
  migration of aggressive ions across the protective mortar;
  corrosion of the pre-stressing wires;
  breaking of the pre-stressing wires and local delamination;
  general delamination of the external mortar;
  depassivation of the wires and acceleration of corrosion.

The process can then accelerate and lead to the breaking of the pipe. Methods of magnetic or acoustic detection allow breaks in wire to be located and the state of the pipe to be assessed. Depending upon the assessed state a decision to repair can be taken.

Repair is generally carried out from the exterior. New reinforcements, passive or pre-stressed, are placed around the pipe in order to collar it. See for example international patent application published as WO 03/014614.

Repairs can also be carried out from the inside by incorporating within the pipe a resistant core for the purpose of re-establishing the resistance lost through the breaking of the pre-stressing wires. Repairs carried out from the inside are generally more expensive. Such repairs are carried out when the excavation works are impossible or difficult.

Repairs from the inside generally consist in placing a metal liner within the pipe. The interstice between the new resistant liner and the pipe is filled with grout. One difficulty is that a local error in realization can lead to infiltrations of water in the injected interstice. This water penetration can cause the concrete core of the pipe to be brought under pressure and can make the new resistant liner inefficient. This will result in a risk of a break in the pipe outside of the new liner.

Another difficulty is that the new metal liner must be welded in situ, both longitudinally and transversally. Such welds are difficult to perform and control and may fail, leading to a bursting of the repaired pipe.

When repairing from the inside the reinforcements added cannot be pre-stressed. When the pipe is brought under pressure these reinforcements undergo a certain elastic deformation (increase in their diameter) which causes cracking of the concrete of the core of the pipe. The concrete breaks in traction for a very small deformation, no material having the capacity to carry any significant stress for such extension. The cracking of the concrete causes two disadvantages. It worsens the flexural strength of the pipe and hence its capacity to resist dissymmetrical thrusts of the earth. It also allows corrosion to progress from the outside environment to the inside of the pipe. It also allows corrosion to progress from the exterior to the interior of the pipe. This risks causing early corrosion of the new reinforcement if it is metal. This problem often leads to the solutions for repairs from the inside with a basis of metal liners to be dismissed.

An alternative solution is disclosed in US 2005/0246995 A1 where a composite structural reinforcement is applied, through in situ stratification of at least one band of reinforcement fibers and a resin matrix, the band being arranged according to a substantially helical path along the internal side of the pipe.

When the pipe is brought back into service the pressure of the liquid tightens the fibers of the band which, if it has appropriate dimensions, will be able to carry most of the radial stress. The composite structure avoids the risks of corrosion encountered with solutions using metal liners. The helical layout allows the in situ stratification of the composite to be carried out which facilitates implementation and avoids the problems of watertight connection, the band covering itself with each turn.

Although this method of reinforcing an embedded cylinder pipe is very efficient, it has been noticed that the application of the band of reinforcement fibers may be difficult and time consuming when using standard methods such as manual application of said band.

One has noticed for example that the band may locally detach or be crumpled when operating conditions are not satisfactory.

SUMMARY OF THE INVENTION

It is an object of the present invention to propose a perfected and efficient method of applying a band of reinforcement fibers where the applying conditions are safe and controllable during the whole process.

The invention thus proposes a method of reinforcing an embedded cylinder pipe by applying a composite structural reinforcement within the pipe through in situ stratification of at least one band of reinforcement fibers and a resin or a resin including matrix comprising the steps of:

applying said band onto a contact area on an internal face of said pipe by means of a contacting member;

moving said contacting member along an helical path so that said contact area follows said path;

moving a main pressing member behind said contacting member along said path, to apply pressure to said band in a main pressure area separated from said contact area.

It is thus possible to control carefully the applying condition of the band onto the internal face of a pipe.

Due to the successive steps of contacting and pressing the band, it is in particular possible to control the stress level in the band during the applying process and to avoid advantageously local detachment or crumpling of the band onto the internal face of the pipe. The stratification of band is then homogeneous all along the pipe and the repair is tight and able to carry radial stress.

A resin suitable for the invention is, for example, a thermoset resin, such as an epoxide base resin, or a thermoplastic resin.

According to an embodiment of the present invention, the band is composed principally of carbon fibers with well established qualities as reinforcement fibers.

In an advantageous embodiment the band is a fabric, for example an unidirectional fabric.

According to another embodiment the band is preimpregnated with at least a resin or resin including matrix, advantageously using a thermoplastic resin.

The preimpregnation resin can be a thermoset resin or a thermoplastic resin. When using thermoplastic resin, it is possible to heat the preimpregnated band before or when applying said band onto the contact area on the internal face of the pipe so as to melt or soften the resin and let it stick when applying pressure in the main pressure area.

According to still another embodiment, said method comprises the step of moving a coating member along the helical path and coating the internal face of said pipe with a resin or resin including matrix in a coating area forward the contact area.

It is thus possible to precoat the internal face of the pipe before applying the band. The resin of this step can be the same than the stratification process or of a different type.

According to another embodiment, the method of the invention comprises the step of moving a coating member along said helical path and coating the previously applied band on said internal face of said pipe with a resin or resin including matrix in a coating area behind said contact area and applying pressure through a secondary pressing member to said band in a secondary pressure area situated behind said main pressure area.

It is thus possible to apply a resin or a resin including matrix on the previously applied band and to impregnate the band.

Said coating member and secondary pressing member can be a sole member, such as a roll. They can also be separate members. A pulverisation member can be such a coating member.

According to preceding embodiments, the resin or the resin including matrix may be obtained by mixing at least an unpolymerized resin and a hardening agent just before the coating step. This embodiment is advantageous when using bi-components resins, such as bi-components epoxy resins.

In a further embodiment:

the band is fed to contact area of internal face of said pipe at a first running speed, $V_1$;

the band is pressed against the internal face of said pipe in the main pressure area at a second running speed, $V_2$;

where said second running speed, $V_2$, is less than first running speed $V_1$, and at least 90% of $V_1$, in particular at least 95%

In an advantageous embodiment, $V_2$ is 98% to 99% of $V_1$.

It is thus possible to release stresses in the band between the contact area and the main pressure area. The band may be free of stress and suitable to fit perfectly the internal face of the pipe, even if surface defects on said internal face are encountered.

According to another advantageous embodiment, the forward moving speed along the axis of the pipe, $V_F$, of the stratification process is driven by said second running speed, $V_2$.

According to preceding embodiment, forward moving speed, $V_F$, may be about, $$V_F = V_2 * W / (2\pi * R * N)$$

where W is the width of the band;

R is the radius of the internal side of said pipe;

N is the number of band layers of the composite structural reinforcement.

Following an example of the repair process, running speed $V_2$ is less than 1 m per minute at beginning of the stratification process and progressively increased up to a constant running speed between 5 to 10 m per minute, for example 8 m per minute.

In a further embodiment, contacting member and/or main pressing member are radially adjustable (a) so as to be kept in contact with the internal face of said pipe.

It is then possible to contact and/or press onto said internal face with a constant stress all along the repair process.

Radially adjustable distance of contacting member and/or pressing member is also advantageous to fit different pipe diameters.

In still another embodiment, contacting member includes a roller driven by a wheel contacting the internal face of said pipe before applying the composite structural reinforcement, and where the peripheral speed of said roller is increased compared to the peripheral speed of said wheel. The peripheral speed of said wheel is driven by forward moving speed $V_F$, and is very close to $V_2$.

Following another embodiment, the band is unwinded from a roll prior to contact the internal face of said pipe.

The roll can be situated inside the pipe to be repaired, preferably moved at forward moving speed $V_F$ or situated out of the pipe and the band introduced through a pipe hole.

In an advantageous embodiment the tension of the unwinded band is regulated so that the band is stress free when applied onto contact area.

According to preceding embodiments the contact pressure in contact area and/or the pressure in main pressure area may be regulated and remain roughly constant along the helical path.

In a further aspect of the invention, there is provided a machine for reinforcing an internal side of an embedded cylinder pipe with a composite structural reinforcement, said composite structural reinforcement comprising at least a band of reinforcement fiber and a resin or resin including matrix, said machine comprising:

a contacting member capable of applying the band to the internal face of said pipe;

a pressing member capable of applying pressure to said band against the internal face of said pipe;

a moving member capable of moving said contacting member and pressing member along an helical path;

where said contacting member and said pressing member are angularly shifted (a) one from the other.

Using such a machine makes possible to repair a pipe following preceding method of reinforcing an embedded cylinder pipe. Such a machine can advantageously be robotized.

Process parameters can be controlled through control units.

The angle $\alpha$ between said contacting member and said pressing member is preferably 5° to 30°, advantageously greater than 7° and/or less than 15°, for example less than 10°.

According to an embodiment, the machine comprises further a band providing member, comprising for example a band roll. As band providing member is part of the machine, it is then possible to run the process completely from inside the pipe.

According to previous embodiment, the rotating speed of said band roll may be regulated through a rotating device, such as for example a jack or an engine. Advantageously the band roll is mounted on a free roll where said jack is attached.

In another embodiment providing member includes at least a drive and tensioning roller. Such a drive and tensioning roller is advantageously regulated so as the band is free of stress.

Following still another embodiment, moving member comprises a rotating member which rotation axis is movable so as to match the longitudinal axis of said pipe and a forward moving member.

In an advantageous embodiment, rotating member includes a rotating motor linked to a vertically sliding member.

According to preceding embodiments, rotating member may include a rotating joint linked to a rotating motor.

According to still another embodiment, contacting member and pressing member are part of a single rotating unit, said rotating unit comprising a shaft linked to a rotating member.

In an advantageous embodiment, the machine further comprises a coating member, comprising for example a coating roller, capable of coating the internal face of said pipe, linked to the moving member, and being angularly shifted from both contacting member and pressing member.

According to preceding embodiment, the coating roller is fed by a plurality of feeding members, comprising for example a plurality of tubes linked to at least a tank.

According to preceding embodiment, the machine includes at least two separate tanks, where a first tank is suitable to contain unpolymerized resin and a second tank is suitable to contain an hardener agent, and where said unpolymerized resin and hardener agent are mixed close to said coating roller.

According to an embodiment, contacting member and/or pressing member are attached to a shaft through radially extendable arm(s).

According to preceding embodiment, radially extendable arm may be radially regulated through actuating a pneumatic jack.

In an advantageous embodiment, contacting member and/or pressing member comprise a roller and/or a blade and/or a brush.

In a further advantageous embodiment, contacting member comprises a roller driven by a wheel suitable to contact the internal face of the pipe, said wheel being linked to said roller with a peripheral speed increase member.

In another embodiment, the machine includes a forward moving member which includes a driving wheel suitable to contact the internal face of said pipe, said driving wheel being moved by a motor through a stabilization member.

According to previous embodiment, the stabilization member may comprise two inclined wheels situated from each side of driving wheel and capable of contacting the internal face of the pipe, said wheels being linked to arms in an adjustable position along said arms.

Following another advantageous embodiment, the machine further includes a front wheel. Said front wheel is intended to orientate the machine when moving forward.

In a preferred embodiment, the front wheel is situated forward the driving wheel.

In another advantageous embodiment, the machine further includes a gyroscope, for example a pendulum, and a controller unit activated by said gyroscope and orientating the front wheel to keep the horizontal position of the machine.

Specific embodiments of the invention will now be described in some further detail with reference to and as illustrated in the accompanying figures. These embodiments are illustrative, and are not meant to be restrictive of the scope of the invention.

If necessary, the internal face of a repair section is prepared mechanically and/or chemically (cleaning, sanding, degreasing . . . ) after emptying said section of the pipe.

DESCRIPTION OF PREFERRED EMBODIMENTS

Figure 1:
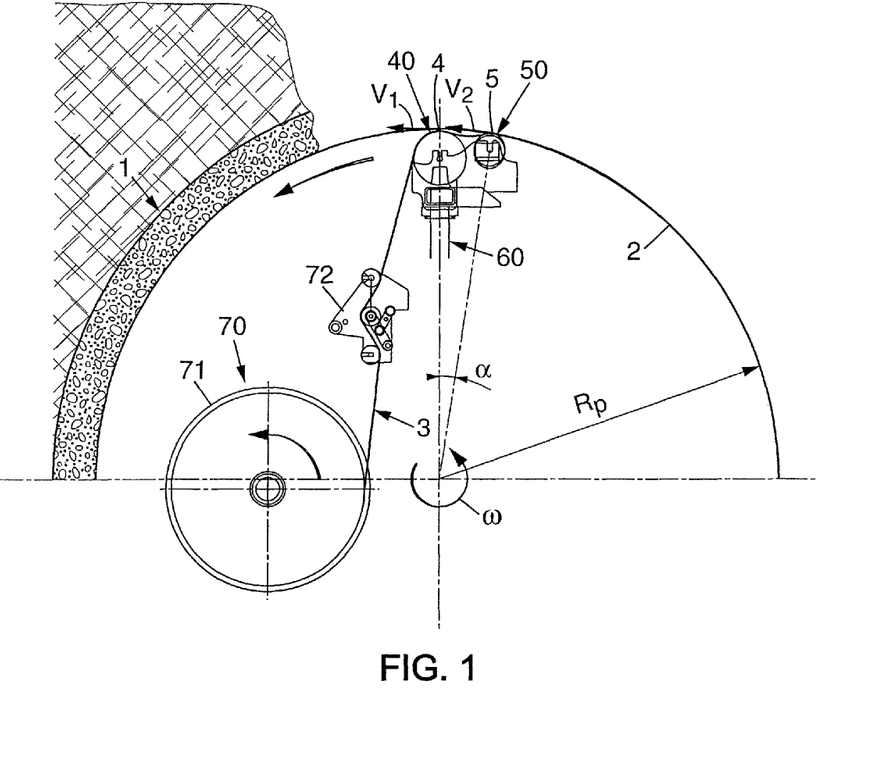
FIG. 1 shows a diagrammatic cross section of a pipe repaired according to the invention.

The cross section of FIG. 1 is shown from the back of pipe being repaired.

Following the present description, the front of the pipe is the part of the pipe which is not repaired and the back of the pipe is the part of the pipe where a composite reinforcement has already been applied.

Using the same wording, the front of a machine according to the invention is the end part of the machine in the forward moving direction and the back of the machine is the opposite end part. Forward moving speed is referred as $V_F$.

According to the invention, a composite reinforcement is arranged inside a damaged underground pipe 1 which radius is Rp. This reinforcement is composed of a band of fibers 3 wound according to a helical path along the internal face 2 of said pipe 1.

Band 3 is unwinded from a band roll 71 which is part of a band providing member 70.

Band 3 is then driven through dive and tensioning rollers 72 and feeds a contacting member 40.

Said contacting member 40 comprises a roller 41. Band 3 is applied onto contact area 4 by means of said contacting member 40. Band 3 is then pressed through a main pressing member 50 in a main pressure area 5. Said pressure area 5 is separated from said contact area 4.

Both contacting member 40 and pressing member 50 are rotating around axis 21 at a rotating speed ω. Axis 21 is arranged so as to coincide with the longitudinal axis of cylinder pipe 1.

Contacting member 40 and pressing member 50 are angularly shifted one from the other by an angle α. As for an example, α is 8°.

The running speed of band 3 when fed to contact area 4 is referred as $V_1$. The running speed of band 3 when pressure is applied in main pressure area 5 is referred as $V_2$.

In the present embodiment there running speeds are respectively the peripheral speeds of rollers 41 and 51.

The reinforcement fibers of the band 3 are made from a resistant material (resistance to breaking typically greater than 1500 MPa) and are of a high elastic module (typically between 100 and 400 GPa). Carbon fibers will generally be used for this (resistance to breaking in the range of 3000 MPa). By way of example, the band 3 has a width of 600 mm and is composed of carbon fibers oriented in the sense of a chain with a small proportion of glass fibers arranged in the sense of a frame in order to obtain a coherent tissue.

The resin used can have an epoxide base. The resin can be heatset and provided to polymerize at ambient temperature. It is for example an epoxy resin, bi-components of the type mentioned EP-A-0 799 951.

Figure 2:
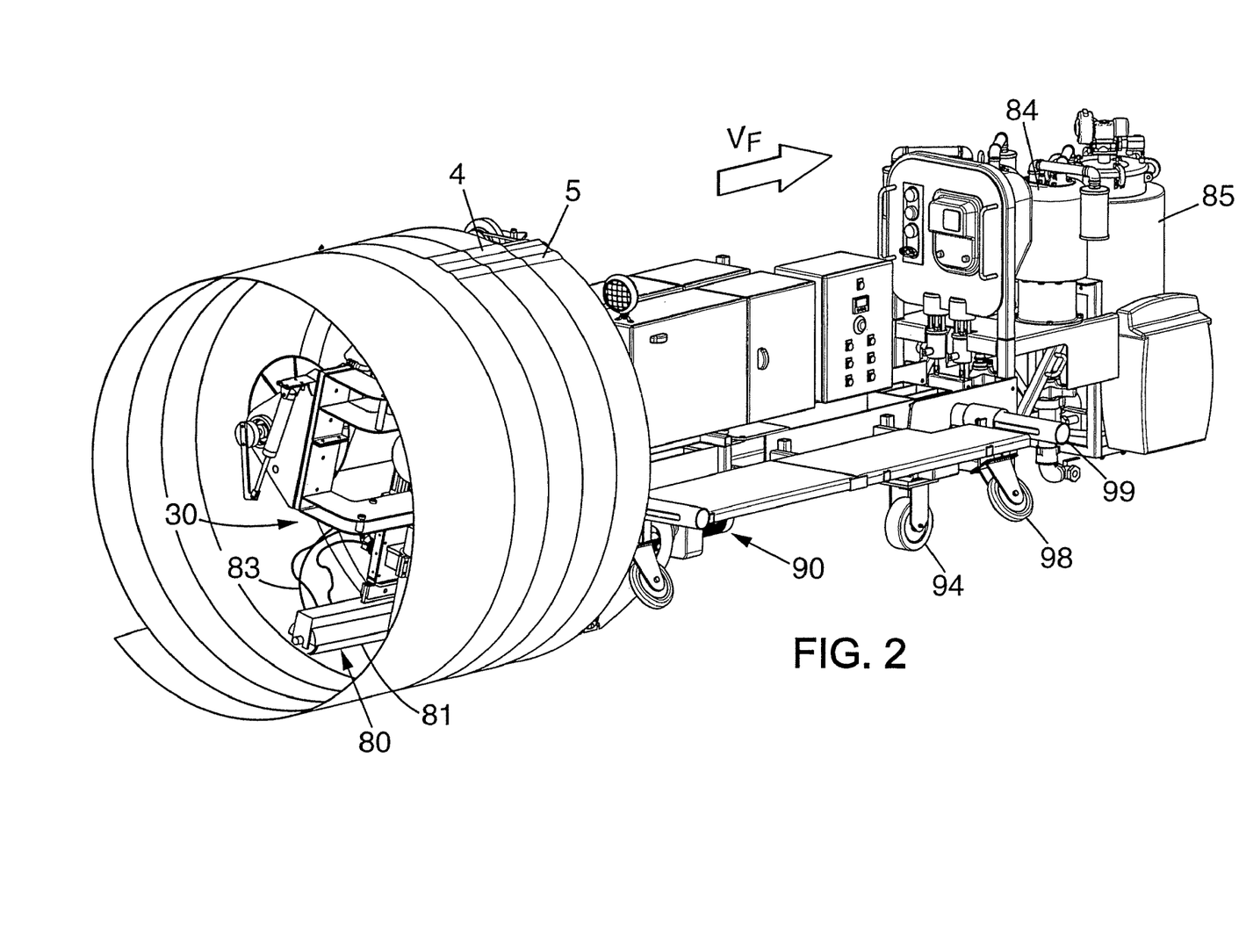
FIG. 2 shows a perspective view from the back of an embodiment of a machine according to the invention applying a composite structural reinforcement according to a process of the invention.
Figure 3:
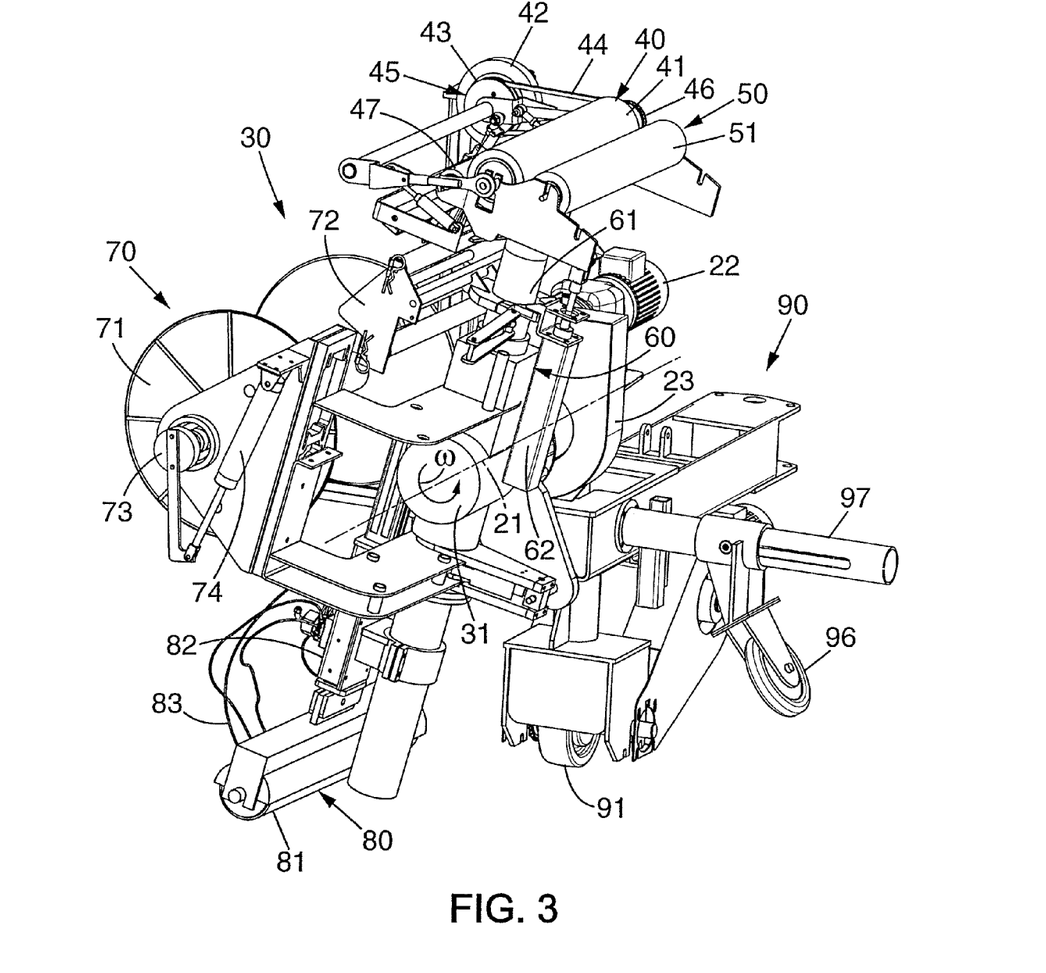
FIG. 3 shows a more detailed perspective view of part of the machine of FIG. 2 from the back.
Figure 4:
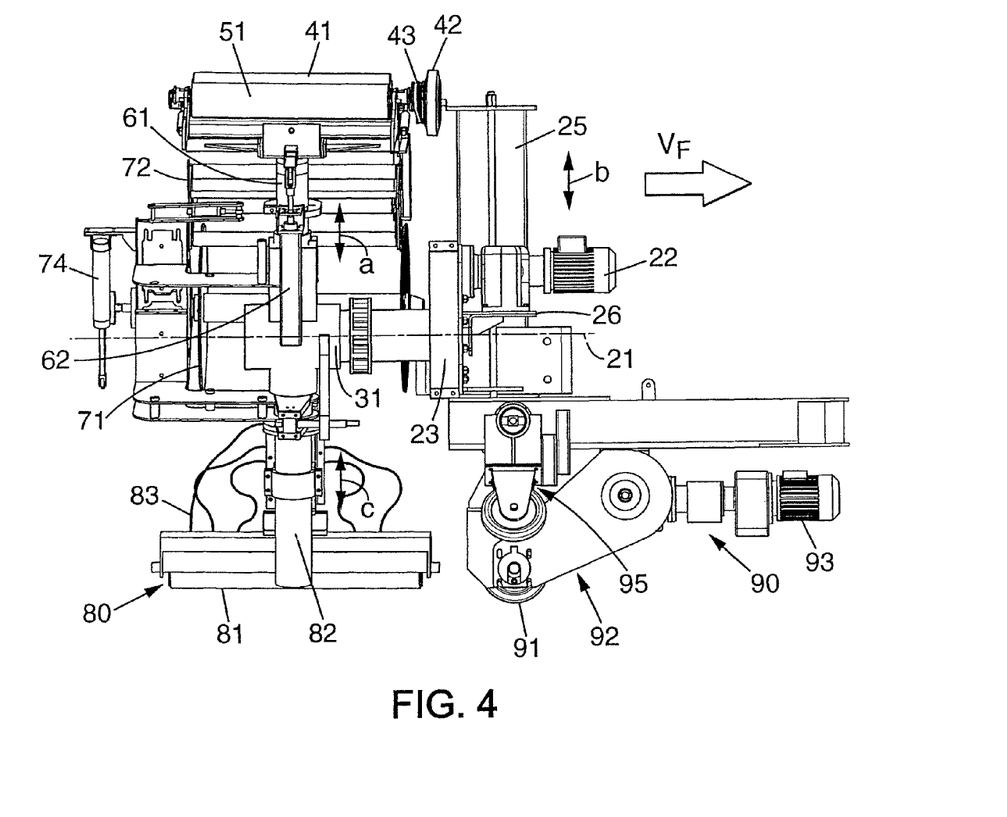
FIG. 4 shows a side view of the part of the machine of FIG. 3.

In the embodiment shown in FIGS. 2, 3, 4, a machine of the invention is built on a frame onto which a rotating unit 30 is attached. Said rotating unit is situated at the back end of said machine.

Tanks are provided at the front end of the machine, comprising a tank 85 for unpolymerized resin and a tank 84 for hardener agent. Pumps are used to bring resin and hardener agent in the rotating unit 30 and feed a coating roller 81, which is part of a coating member 80, through a plurality of tubes 83.

Roller 81 of coating member 80 is larger than the band width and partially disposed ahead the helical path of the band. It thus provides simultaneously coating forward contact area 4 and coating the previously applied band. Following the present embodiment, roller 81 is simultaneously a coating and a secondary pressing member.

The machine is driven by a forward moving member 90 and orientated by front wheel 94. A stabilization member 95 is formed of two pairs of inclined wheels 96, 98 which are situated from each side of the frame and linked to arms 97, 99 in an adjustable position and contact the internal face of the pipe.

In FIG. 2, the pipe has been removed but the applied band 3 can still be seen. In the present embodiment the advancing of the band over a winding turn corresponds to about a third of the width of the band and this ensures three thicknesses of fibers on the surface of the pipe. One can see the impression of rollers 41 and 51, forming respectively contact area 4 and pressure area 5.

Referring now to FIGS. 3 and 4 where rotating unit 30 and forward moving member 90 can be seen with more details:

The machine is moved forward by driving wheel 91 linked to motor 93 by a belt (inside part 92).

Rotating unit 30 is linked by shaft 31 to motor 22 through rotating joint 23. Compressed air, resin and hardener agent can pass through said rotating joint 23.

Motor 22 is linked through support part 26 to a vertically sliding member 25. Sliding member 25 comprises an endless screw and a guiding part. It is thus possible to vary vertically the position (b) of axis 21 of the rotating unit 30.

Said rotating unit 30 comprises a contacting member 40, a pressing member 50, a coating member 80.

Contacting member 40 and pressing member 50 are linked to shaft 31 through arm 60. Arm 60 comprises a radially extendable (a) part 61 activated by a pneumatic jack 62.

Coating member 80 is linked to shaft 31 by a radially extendable (c) part 82.

Contacting member 40 comprises a roller 41 which is rotated by a belt 44, said belt 44 being rotated by a wheel 42 contacting the internal face of the pipe. Belt 44 engages pulleys 43 and 46. Pulley 43 is linked to wheel 42 where pulley 46 is linked to roller 41. Diameter of pulley 46 is less than diameter of pulley 43 so as the rotation speed of roller 41 is greater than the one of wheel 42 and to constitute a peripheral speed increase member 45.

It is thus possible to increase running speed $V_1$ compared to running speed $V_2$.

The band to be applied is unwinded from providing member 70, and feeds roller 41 after being driven to said roller 41 by an intermediate roller 47.

Providing member 70 is mounted on rotating unit 30 by means of a free roll 73 which can be activated by a jack 74.

The invention is not restricted to the above described embodiments which can be varied in a number of ways within the scope of the claims.

The invention claimed is:

1. A machine for reinforcing an internal side of an embedded cylinder pipe with a composite structural reinforcement, said composite structural reinforcement comprising at least a band of reinforcement fiber and a resin or resin including matrix, said machine comprising:
   a contacting member capable of applying the band to the internal face of said pipe;
   a pressing member capable of applying pressure to said band against the internal face of said pipe;
   a moving member capable of moving said contacting member and pressing member along an helical path;
   where said contacting member and said pressing member are angularly shifted (α) one from the other, and
   wherein the contacting member comprises a roller driven by a wheel suitable to contact said internal face of said pipe, said wheel being linked to said roller with a peripheral speed increase member, and where the peripheral speed of said roller is increased compared to the peripheral speed of said wheel.

2. The machine of claim 1 comprising further a band providing member, comprising a band roll.

3. The machine of claim 2 where the rotating speed of said band roll is regulated through a rotating device.

4. The machine of claim 2 where said band providing member includes at least a drive and tensioning roller.

5. The machine of claim 1 where said moving member comprises a rotating member which rotation axis is movable so as to match the longitudinal axis of said pipe and a forward moving member.

6. The machine of claim 1 where said rotating member includes a rotating motor linked to a vertically sliding member.

7. The machine of claim 5 where said rotating member includes a rotating joint linked to a rotating motor.

8. The machine of claim 1 where said contacting member and said pressing member are part of a single rotating unit, said rotating unit comprising a shaft linked to a rotating member.

9. The machine of claim 1 further comprising a coating member, comprising a coating roller, capable of coating the internal face of said pipe, linked to the moving member, and being angularly shifted from both contacting member and pressing member.

10. The machine of claim 9 where said coating roller is fed by a plurality of feeding members, comprising a plurality of tubes linked to at least a tank.

11. The machine of claim 10 including at least two separate tanks, where a first tank is suitable to contain unpolymerized resin and a second tank is suitable to contain a hardener agent.

12. The machine of claim 1 where said contacting member and/or said pressing member are attached to a shaft through radially extendable arm(s).

13. The machine according to claim 12 where said radially extendable arm is radially regulated through actuating a pneumatic jack.

14. The machine of claim 1 including a forward moving member which includes a driving wheel suitable to contact the internal face of said pipe, said driving wheel being moved by a motor through a stabilization member.

15. The machine of claim 14 where said stabilization member comprises two inclined wheels situated from each side of driving wheel and capable of contacting the internal face of the pipe, said wheels being linked to arms in an adjustable position along said arms.

16. The machine of claim 1 which further includes a front wheel.

17. The machine of claim 16 which further includes a gyroscope, a pendulum, and a controller unit activated by said gyroscope and orientating the front wheel to keep the horizontal position of the machine.

* * * * *